(12) United States Patent
Stein et al.

(10) Patent No.: US 9,356,920 B2
(45) Date of Patent: *May 31, 2016

(54) DIFFERENTIATING BETWEEN GOOD AND BAD CONTENT IN A USER-PROVIDED CONTENT SYSTEM

(71) Applicant: Facebook, Inc., Menlo Park, CA (US)

(72) Inventors: Christopher Alexander Stein, San Francisco, CA (US); Lev Timourovich Popov, San Francisco, CA (US); Evan Stratford, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,042

(22) Filed: Jul. 15, 2014

(65) Prior Publication Data

US 2014/0331283 A1    Nov. 6, 2014

Related U.S. Application Data

(63) Continuation of application No. 12/946,731, filed on Nov. 15, 2010, now Pat. No. 8,819,816.

(51) Int. Cl.
*G06F 11/00* (2006.01)
*G06F 12/14* (2006.01)
(Continued)

(52) U.S. Cl.
CPC ............. *H04L 63/08* (2013.01); *G06F 15/16* (2013.01); *G06F 21/552* (2013.01); *G06F 21/566* (2013.01); *H04L 12/585* (2013.01);
(Continued)

(58) Field of Classification Search
CPC ... H04L 12/58; H04L 12/585; H04L 12/5855; H04L 12/588; H04L 51/12; H04L 51/14; H04L 51/32; H04L 63/0245

USPC ........................................................ 726/22
See application file for complete search history.

(56) References Cited

U.S. PATENT DOCUMENTS

| | | | | |
|---|---|---|---|---|
| 6,546,416 B1 * | 4/2003 | Kirsch | ................ | G06Q 10/107 709/206 |
| 7,086,085 B1 * | 8/2006 | Brown | ................ | G06F 21/6218 714/E11.207 |

(Continued)

OTHER PUBLICATIONS

Oxford English Dictionary, "Definition of Social Networking," one page, date unknown. [Online] [Retrieved Jan. 25, 2014] Retrieved from the Internet <URL:http://www.oxforddictionaries.com/us/definition/american_English/Social-networking.>

(Continued)

*Primary Examiner* — Amir Mehrmanesh
*Assistant Examiner* — Quy Pham
(74) *Attorney, Agent, or Firm* — Fenwick & West LLP

(57) ABSTRACT

A system differentiates good content from bad content in a user-provided content system. Messages are analyzed for features that characterize messages. A feature may occur in one or more messages. A feature that has more than a threshold number of occurrences in messages in a time interval is identified for further analysis. Enhanced authentication is requested from senders of the messages with occurrences of the identified feature. Based on the rate at which senders of the messages pass authentication, the content associated with the message is determined to be good content or bad content. Subsequent messages are blocked or successfully delivered based on whether features occurring in the messages are indicative of good content or bad content.

20 Claims, 5 Drawing Sheets

(51) Int. Cl.
*G06F 12/16* (2006.01)
*G08B 23/00* (2006.01)
*H04L 29/06* (2006.01)
*H04L 12/58* (2006.01)
*G06F 15/16* (2006.01)
*G06F 21/55* (2013.01)
*G06F 21/56* (2013.01)

(52) U.S. Cl.
CPC ............. *H04L 51/12* (2013.01); *H04L 51/32* (2013.01); *H04L 63/0245* (2013.01)

(56) References Cited

U.S. PATENT DOCUMENTS

| | | | | |
|---|---|---|---|---|
| 7,752,669 | B2 * | 7/2010 | Palliyil | G06F 21/566 713/187 |
| 7,836,133 | B2 * | 11/2010 | Quinlan | G06Q 10/107 709/206 |
| 8,046,832 | B2 * | 10/2011 | Goodman | G06Q 10/107 709/206 |
| 2004/0177120 | A1 * | 9/2004 | Kirsch | H04L 12/585 709/206 |
| 2005/0198159 | A1 * | 9/2005 | Kirsch | H04L 51/12 709/206 |

OTHER PUBLICATIONS

United States Office Action, U.S. Appl. No. 12/946,731, Feb. 5, 2014, 27 pages.

United States Office Action, U.S. Appl. No. 12/946,731, Jul. 10, 2013, 25 pages.

United States Office Action, U.S. Appl. No. 12/946,731, Nov. 2, 2012, 20 pages.

* cited by examiner

DIFFERENTIATING BETWEEN GOOD AND BAD CONTENT IN A USER-PROVIDED CONTENT SYSTEM

BACKGROUND

This invention relates to differentiating between good content and bad content in a user-provided content system based on features identified in the content.

Systems allow users to interact with each other by sending messages to each other. For example, a social networking system allows users of the social networking system to interact with other users via status updates, wall posts, or private messages. Messages comprise data, which represents the content of the messages, and metadata, which represents information describing the messages. The data sent in a message is also called content, and the system that allows users to send messages is called a user-provided content system. Metadata associated with a message can comprise information describing the sender of the message, the recipient of the message, attributes of an interface used to send the message, attachments to the message, a level of urgency or importance of the message, and the like. Some messages are intended to be private messages delivered to either one recipient or a small set of recipients whereas other messages are broadcast messages intended for a large number of recipients. For example, a wall post message in a social networking system can be accessed by all friends of the recipient in the social networking system or even friends of the friends of the recipient subject to the privacy settings of the users.

Messages allow a user to send information to other users. For example, a user aware of an event may send information describing the event to other users. Similarly a user can share an interesting webpage with other users by sending them the uniform resource locator (URL) of the webpage in a message. A user may share an interesting document with other users by sending the document as an attachment to a message. A user may share an application with other users by sending an executable file of the application as an attachment to a message.

Some users represent businesses and organizations that send information associated with the business or organization to users in messages. For example, a business may advertise new products by sending messages to subscribers of certain mailing list. Alternatively, the business may send a different message to each subscriber by customizing the content of each message to the recipient. The number of messages sent by an organization can be significantly larger than the number of messages sent by a user representing a person.

Messages can be sent by malicious users for purposes harmful to other users. For example, a malicious user can send harmful or offensive content to users that never requested the content. The harmful content may comprise executables that could have undesired effect on the recipient's computing device. Malicious users attempt to steal credentials of existing users of the system and send messages from the stolen accounts. The stolen account continues to be a valid account until the system realizes the account is stolen and locks it. This gives the malicious user a window of opportunity to use the account for illegal purposes. Malicious users are likely to use stolen accounts for sending messages since a recipient is more likely to look at a message if the message appears to be sent by an acquaintance. Usually the fact that a message is malicious is determined after the message is delivered to the recipient and a harmful effect of the message has already occurred.

SUMMARY

Embodiments of the invention allow differentiating between good content and bad content in a user-provided content system. Messages are received from users of a user-provided content system for delivery to one or more other users of the system. A set of features is identified for the received messages. Each feature can be associated with one or more messages. The system tracks the rate at which the features are found in messages within the system, and a particular feature is identified for which occurrences of the feature in messages during a time interval exceeds a threshold value. The system then requests enhanced authentication from one or more users who sent the messages in which the feature occurred. The rate at which users pass the authentication is used to determine whether the identified feature is indicative of good or bad content. Incoming messages with occurrences of the feature are handled based on the information that the feature is indicative of bad content.

In an embodiment, if the rate at which users pass authentication is below a threshold value, the message is determined to be indicative of bad content. Incoming messages with occurrences of a feature indicative of bad content are blocked from delivery. In an embodiment, if the rate of users passing authentication is above a threshold value, the message is determined to be indicative of good content. Incoming messages with no occurrences of features indicative of bad content are delivered successfully to their recipients. In an embodiment, the threshold rate required to pass authentication is determined based on a measure of risk associated with a set of features. In an embodiment, passing authentication comprises answering a challenge question.

The features and advantages described in this summary and the following detailed description are not all-inclusive. Many additional features and advantages will be apparent to one of ordinary skill in the art in view of the drawings, specification, and claims hereof.

Figure 1:
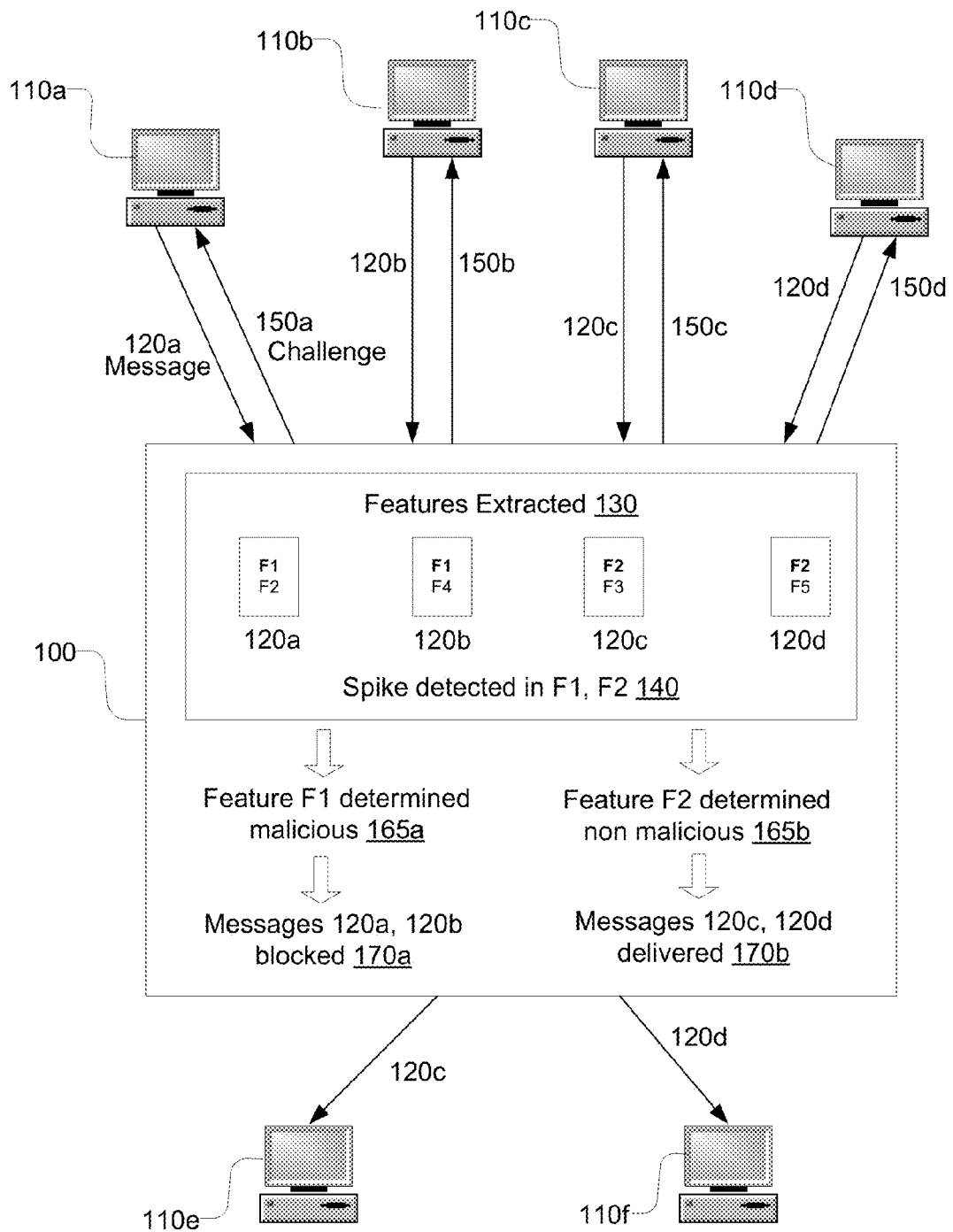
FIG. 1 is a diagram illustrating overall system environment for determining whether incoming messages are indicative of good or bad content, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A message comprises data or content sent with the message as well as metadata associated with the message. Metadata associated with the message can comprise information associated with the sender and receiver, time the message is sent or received, annotations associated with the message including a level of urgency, level of importance, security information and the like. The information associated with a message can be analyzed to determine features of the message. A feature is a property of one or more messages that characterizes the messages and distinguishes them from messages that lack the feature. A feature can be a portion of information associated with a message. A feature can be a pattern that occurs in information associated with messages. Examples of features of message include a particular string or a regular expression that is part of the message, an internet protocol (IP) address associated with a sender of a message, a time of transmission of the message, and the like. Some messages include a particular URL string as part of the message that can be considered a feature. For example, a user can send invitations to an event by sending messages that contain URL of a website describing the event. A number of messages may be sent from a computing device with a particular IP address. Examples of features in these messages include the IP address of the sender, the netblock of the sender, the settings of the computer or application used for sending the messages and the like. A number of messages may be sent by one or more computers in a short time interval. The interval of time during which these messages are sent is a feature occurring in these messages. In an embodiment, a short time interval is a time interval that has a length below a threshold value.

Messages sent within a particular time interval can be analyzed to determine a frequency of occurrence of the feature in messages. A histogram can be generated for different features based on the number of occurrences of each feature in messages sent during a time interval. For example, in a particular time interval a number of messages may be sent containing a specific universal resource locator (URL). The changes in the frequency of messages associated with a feature are analyzed over time. A sudden increase in the occurrences of a feature in a given time interval is identified as a spike in the feature. A feature that is associated with a spike is considered a suspicious feature and is further analyzed to determine whether the feature is indicative of bad content or good content in messages.

A message sent from an account and the content in the message is deemed good or bad depending on whether the message is sent by a user authorized to use the account or not. In other words, if the user sending a message from an account can pass the challenge test or any authentication required, the user is deemed to be authorized and the content considered good. The challenge questions are selected as questions that can be answered only by authorized users of the account. Accordingly, content is considered good or bad depending on whether the sender of the message can or cannot pass a challenge test or any other required authentication. Bad content is also referred to as malicious content and good content referred to as non-malicious content. One type of challenge question aimed at automated computing algorithms is called a CAPTCHA, which is an acronym for "Completely Automated Turing Test To Tell Computers and Humans Apart." If a system requires users to be real persons and disallows automatic messages being sent via the system, any computer generated message would be considered bad content. However, messages sent by authorized users of accounts are deemed good even if they cause harmful effects on the recipients.

A spike in a feature is considered suspicious since it can be indicative of a malicious activity, for example, a hacker sending potentially harmful messages from a stolen account. For example, a malicious user can use a stolen account to send messages asking recipients of the message to view a webpage at a given URL wherein the webpage can download harmful content on the viewer's computing device. This is an example of a feature indicative of malicious or bad content. On the other hand, a spike can be caused by non-malicious content sent by users. For example, authentic users may send messages to each other associated with a popular event and may include a URL associated with the event. These messages include the URL of the event as a common feature. As another example, a large number of messages can be sent from a particular netblock in a short time interval by organizers of a popular event. These messages have the netblock of the source of the messages as a common feature. If the number of occurrences of these features in a time interval exceeds a threshold value, a system can determine that a spike in messages with these features was observed and accordingly these features are associated with spikes. Even though these features are associated with spikes, these features are indicative of non-malicious content or good content.

A process if followed to determine whether a feature associated with a spike is indicative of good content or bad content in messages. Senders of messages associated with a spike in a feature are required to pass authentication. For example, the users may be presented with a challenge and responses to the challenge provided by the users monitored. An example of a challenge can be a security question that can only be answered by an authentic user. If more than a threshold percentage of senders required to authenticate pass the required authentication, the feature is added to a white-list. If the percentage of senders that pass the authentication is below a threshold, the feature may be added to a black-list. Alternatively, if more than a threshold percentage of users fail the required authentication or refuse to answer a challenge presented, the feature can be added to a black-list. Messages that are added to a white-list are considered non-malicious (or good) messages and messages added to a black-list are considered malicious (or bad) messages.

The presence of a feature in a white-list or a black-list is used to determine how subsequent messages comprising that feature are processed. If a message with a black-listed feature is identified, the message delivery may be blocked. Alternatively, if a message with a black-listed feature is identified, the sender of the message may be required to pass additional authentication. In an embodiment, if the percentage of passed authentications associated with the feature exceeds a predetermined threshold over a large interval of time, the feature may be moved from black-list to white-list. If the percentage of passed authentications associated with the feature fails to exceed a predetermined threshold over a large interval of time, the feature is retained in the black-list and subsequent messages with the feature blocked. If all features occurring in a message are determined to be white-listed, the message can be delivered as requested.

FIG. 1 illustrates a system environment for determining whether incoming messages are indicative of good or bad content, in accordance with an embodiment of the invention. Client devices 110 communicate with a social interaction system 100 via a network. The social interaction system 100 allows users of the system to interact with other users via one or more types of messages. FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

The client devices 110a, 110b, 110c, and 110d send messages 120a, 120b, 120c, and 120d respectively via the social interaction system 100 within a specific time interval. The social interaction system 100 extracts features 130 for the messages 120a, 120b, 120c, and 120d in order to analyze the time interval for presence of spikes associated with features. Feature F1 occurs in two messages 120a, 120b whereas features F2, F4 occur once in each message. Similarly feature F2 occurs in messages 120c and 120d, whereas features F3 and F5 occur once in each message. In general, a higher rate of occurrence of a feature within a short time interval is determined to be a spike in the feature. As shown in FIG. 1, the social interaction system 100 detects 140 a spike in features F1 and F2 since their rate of occurrences in messages 110 is determined to be above a threshold value.

The social interaction system 100 follows a process to determine whether the features F1 and F2 are indicative of malicious activities or non-malicious activities. The social interaction system 100 presents the senders of the messages comprising features F1 and F2 with one or more challenge questions. Although the FIG. 1 shows the social interaction system 100 sending the challenges 150 to the client device that sent the corresponding message 120, the senders of the messages 120 can receive and process the challenge 150 by alternate means, for example, by using other client devices or even via other communication mechanisms like phones or texting. If more than a threshold number or percent of senders who receive challenge questions for a particular feature solve the challenge questions successfully, the feature is determined to be indicative of non-malicious or good content or activities. On the other hand, if the number or percent of senders of messages who can solve the challenge question is below a threshold value, the feature is determined to be indicative of malicious or bad content or activity. Alternatively, if the number of senders who attempt to solve the challenge question unsuccessfully or refuse to solve the challenge or ignore the challenge is above a threshold value. A user is considered as ignoring the challenge question if the user does not attempt to solve the challenge within a predetermined length of time. In an embodiment, the various types of responses that indicated that the user failed to solve the challenge can be weighted differently. For example, the weight of a challenge question that is solved incorrectly can be higher than the weight assigned to a challenge question ignored by the user. In an embodiment, a user that solves a challenge question incorrectly is presented with an alternate challenge question, assuming the previous incorrect answer was provided mistakenly. However a subsequent incorrect answer confirms the fact that the user failed to solve the challenge question. A feature indicative of malicious or bad content in message is also called a malicious or bad feature and a feature indicative of non-malicious or good content is called a non-malicious or good feature.

As shown in FIG. 1, the feature F1 is determined 165a to be malicious and feature F2 is determined 165b to be non-malicious. Accordingly the social interaction system 100 blocks 170a the messages 120a, 120b comprising feature F1. However, the social interaction system 100 delivers 170b messages 120c, 120d comprising feature F2 (provided they do not comprise any other feature indicative of bad content) to their destinations 110e and 110f. In some embodiments, the social interaction system 100 may decide to require further authentication before delivering a message with a malicious feature. If over time, the number of successful authentications for messages with a malicious feature indicates that the feature was incorrectly determined to be malicious, the feature can be moved from black-list to white-list. Subsequent messages comprising the same feature can be successfully delivered as requested unless they comprise other malicious features or suspicious features, i.e., features associated with spikes that have not been categorized as either malicious or non-malicious.

Figure 2:
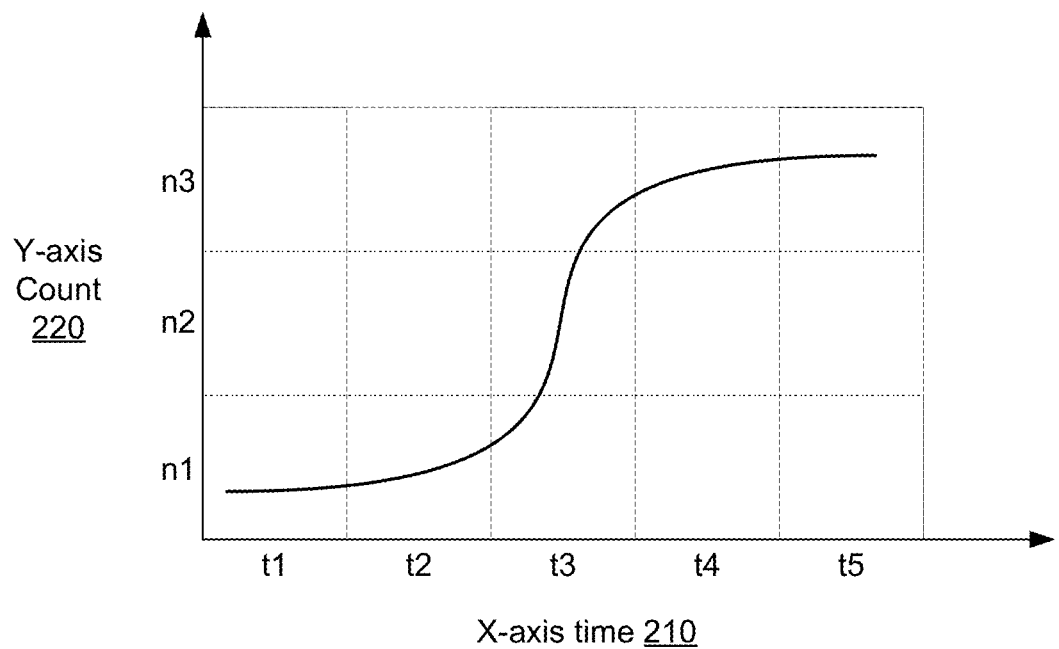
FIG. 2 illustrates a spike in a feature as determined by an increase in frequency of occurrences of the feature in messages, in accordance with an embodiment of the invention.

FIG. 2 illustrates graphically an increase in the number of messages associated with a feature resulting in a spike. The x-axis 210 shows time divided into various intervals t1, t2, t3, etc. The y-axis 220 of the graph shows the count of messages associated with the feature at any given time-point. The time interval t3 shows a significant increase in the count of messages for the feature compared with other time intervals. As shown in FIG. 2 the count of messages comprising the feature increases in time interval t3 and stays at the increased level in time intervals t4 and t5. In other instances, the count of messages comprising a feature may increase in a particular time interval and then reduce in a subsequent time interval. However, either kind of behavior indicative of a significant increase in the count of messages comprising a feature within a short time interval is considered an indication of suspicious behavior associated with the feature that needs further processing to determine whether the feature is malicious or non-malicious.

System Architecture

Figure 3:
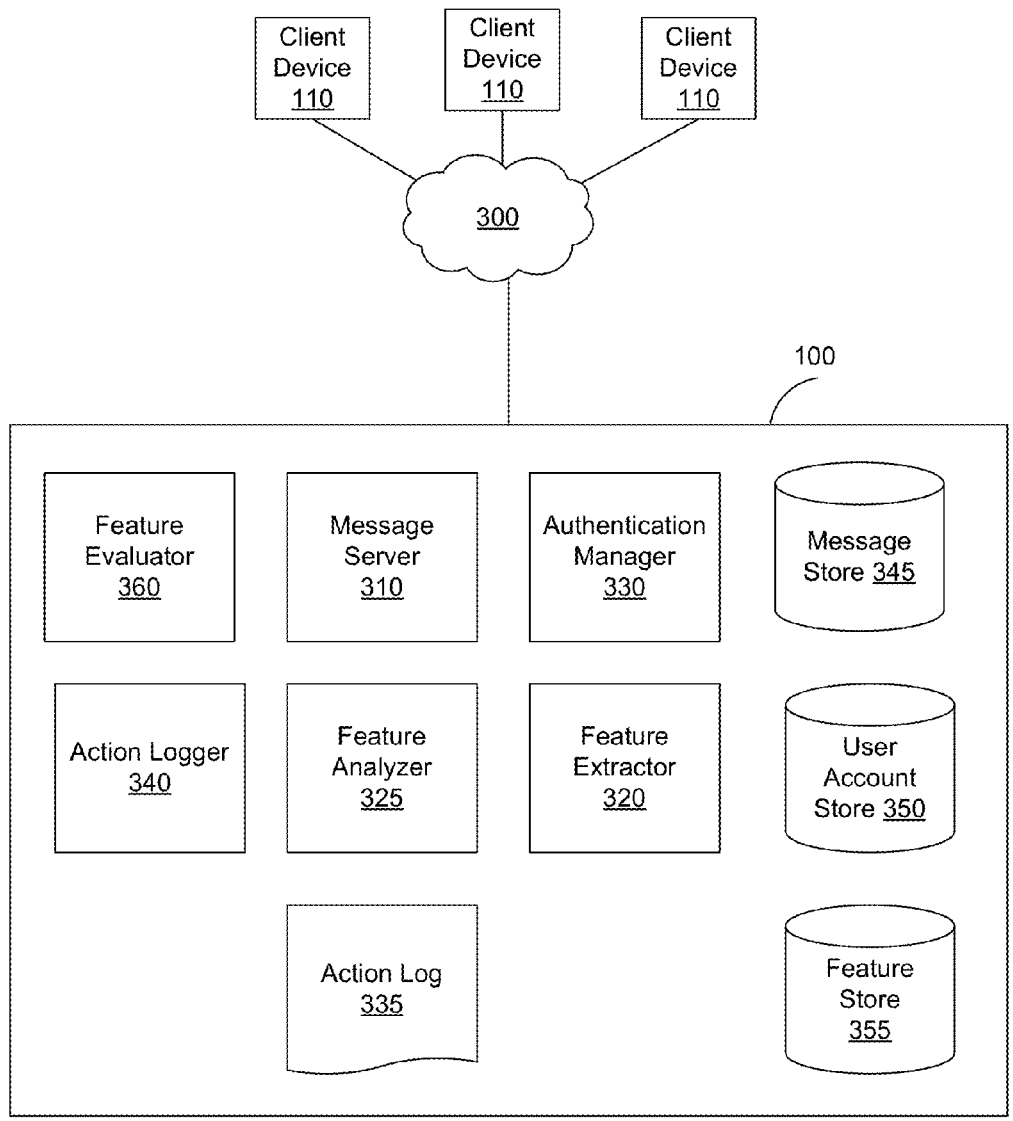
FIG. 3 illustrates the system architecture for determining whether incoming messages are indicative of good or bad content, in accordance with an embodiment of the invention.

FIG. 3 illustrates the system architecture for determining whether incoming messages are indicative of good or bad content, in accordance with an embodiment of the invention. The overall system environment comprises one or more client devices 110, a social interaction system 100, and a network 300. In alternative configurations, different and/or additional systems or modules can be included in the overall system environment.

The client devices 110 comprise one or more computing devices that can receive user input and transmit and receive data via the network 300. For example, the client devices 110 may be desktop computers, laptop computers, smart phones, personal digital assistants (PDAs), mobile phones, or any other device including computing functionality and data communication capabilities. The client devices 110 are configured to communicate via network 300, which may comprise any combination of local area and/or wide area networks, using both wired and wireless communication systems.

In one embodiment, the network 300 uses standard communications technologies and/or protocols. Thus, the network 300 can include links using technologies such as Ethernet, 802.11, transmission control protocol/internet protocol (TCP/IP), the hypertext transport protocol (HTTP), the file transfer protocol (FTP), etc. The data exchanged over the network 300 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), etc. In another embodiment, the entities can use custom and/or dedicated data communications technologies instead of, or in addition to, the ones described above.

FIG. 3 contains a block diagram of the social interaction system 100. The social interaction system 100 includes a message server 310, an action logger 340, an authentication manager 330, a feature extractor 320, a feature analyzer 325, feature evaluator 360, an action log 335, a user account store 350, a feature store 355, and a message store 345. In an embodiment, the social interaction system 100 can be a website. In other embodiments, the social interaction system 100 may include additional, fewer, or different modules for various applications. Conventional components such as network interfaces, security mechanisms, load balancers, failover servers, management and network operations consoles, and the like are not shown so as to not obscure the details of the system.

The social interaction system 100 comprises a computing system that allows users to communicate or otherwise interact with each other and access content as described herein. The social interaction system 100 stores user accounts that describe the users of the social interaction system 100. The user account store 350 stores authentication information associated with the users, for example, login and password information, possible challenge questions that can be asked to the user for authentication. In some embodiments, the user account store 350 stores information about users including biographic, demographic, and other types of descriptive information, such as work experience, hobbies or preferences, and the like.

The action logger 340 populates the action log 335 with information about various user actions in the social interaction system 100 to track them. Any action that a particular user takes with respect to another user is associated with each user's account, through information maintained in a database or other data repository, such as the action log 335. Such actions may include, for example, sending a message to the other user, reading a message from the other user, viewing content associated with the other user, attending an event posted by another user, among others. In addition, a number of actions described below in connection with other objects are directed at particular users, so these actions are associated with those users as well. In one embodiment, the social interaction system 100 maintains the action log 335 as a database of entries.

The message server 310 allows communications between the users of the social interaction system 100. The users of the social interaction system 100 use client devices 110 to send messages to one or more users of the social interaction system 100. Messages sent by users of the social interaction system 100 are received by the message server 310 and routed to the desired location. The messages can be instant messages, queued messages (e.g., email), text and SMS (short message service) messages, or messages based on any other suitable messaging technique. A message can be received one or more users, for example, a wall post of a social networking system can be read by multiple users of the social networking system. On the other hand the message can be a private message from one user to another user of the social interaction system 100.

The message server 310 stores the message received in the message store 345. In some embodiments, the message store 345 is a database that allows access to the messages via various indexes. For example, the message store 345 can be accessed to retrieve messages from a specific sender, messages sent during a particular time interval, or messages targeted towards a particular recipient. The message store 345 allows other components of the social interaction system 100, including feature extractor 320 and feature analyzer 325 to analyze the messages in order to determine whether the message is associated with a malicious activity. The feature extractor 320 can determine features of a message and augment the information of the message in the message store 345. For example, if the feature extractor 320 determines that the message comprises a particular URL string, the feature extractor 320 augments the message store 345 with this additional information. The message server 310 can block the message from delivery if the message is associated with a malicious activity or deliver the message as requested if the message is not associated with malicious activity.

The feature extractor 320 analyzes messages to extract features from the messages. The feature extractor 320 analyzes content of the message, metadata associated with the message as well as other information associated with the messages, for example, the time at which the message is sent. The feature extractor 320 extracts features from information stored in message store 345 as well as information stored in the action log 335 associated with messages. For example, the action log 335 may store specific errors or warnings returned by the message server 310 during processing of a particular message. This information may not be stored in the message store 345.

In one embodiment, the feature extractor 320 analyzes messages for specific patterns. For example, the feature extractor may analyze a message to find strings beginning with "http://" or strings of the format "www.name.extension" to determine if the message includes a URL string. The feature extractor 320 identifies specific regular expressions in the message content. In an embodiment, the social interaction system1 100 maintains a set of regular expressions used for identifying features in messages. The set of regular expressions is stored in the feature store 355. The set of regular expressions is enriched over time as new regular expressions are discovered and added, either automatically or by system administrators. Alternatively, the social interaction system 100 uses machine learning to identify potential regular expressions. For example, an unsupervised learning or clustering system may discover a potential regular expression based on text encountered in the content of the message or the IP addresses associated with the message. The feature extractor 320 accumulates feedback reputation of the identified feature. The feature extractor 320 determines a weight of the feature based on the feedback and can optionally block the feature if the feedback is determined to be insufficient. The feature may be activated once the feedback exceeds a threshold value.

In one embodiment, the feature extractor 320 analyzes the text in a message to determine the frequency of various terms in the message. A term comprises words or phrases that occur in a message. A specific term that has rare occurrence in messages on an average but occurs with a higher frequency above a threshold in a message can be identified as a feature. In an embodiment, the presence of a term in a message is considered a feature. The feature extractor 320 analyzes metadata associated with the message to extract features. Examples of features extracted from the message include, features based on information of the sender of the message including the internet protocol (IP) address of the sender, netblock of the sender, information identifying a user-agent or an application used to send the message, for example, a hash value based on browser settings of the client device used to send the message, domain of the sender of the message, and the like. Other features include the type of interface used for sending the message, for example, messages sent via specific API calls, messages sent as wall posts or private point-to-point messages.

Features extracted by the feature extractor 320 based on other information associated with the message include the time during which the message was sent or received, types of attachments with the messages, the names, sizes, and extensions of attachments of the messages. Other features include specific errors or warnings encountered during the processing of the message. For example, a specific warning or error generated by the message server 310 and logged in the action log 335 can be considered a feature. In an embodiment, clustering is performed on the feature streams to identify new feature values as well as weights associated with feature values to determine the most promising features.

The feature extractor 320 extracts features from the messages and adds them to the feature store 355. The feature store 355 stores information associated with each feature including an identifier of the feature, a type of the feature, and information describing the feature for example, a regular expression, an IP address, a domain name etc. In an embodiment, the message store 345 links messages in the message store 345 with features stored in the feature store 355. A new feature extracted by the feature extractor 320 is added to the feature store 355. If a message is determined to be associated with an existing feature, the information describing the message in the message store 345 is linked to the corresponding feature in the feature store 355. The feature store 355 may generate indexes for accessing information associated with the features, for example, accessing all messages comprising the feature, messages comprising combinations of features, messages comprising specific features that were communicated in a particular time interval and the like.

The feature analyzer 325 analyzes statistical information associated with features extracted by the feature extractor 320 that are stored in the feature store 355. The statistical information associated with features analyzed by the feature analyzer 325 includes the frequency of occurrence of various features and its variation with time. In an embodiment, the feature analyzer 325 generates histograms of features for different time intervals. The feature analyzer 325 also analyzes changes in frequency of features over time to identify spikes as represented by increases in number of occurrences of messages comprising a feature in a short interval of time. The feature analyzer 325 also analyzes frequencies of occurrence of combinations of feature, for example, whether two features have a high likelihood of occurring together in a message. As an example, multiple senders can use the same netblock to send messages comprising a particular URL. In this example, the combination of netblock and the URL can be considered together being associated with a spike. The feature analyzer 325 analyzes the frequency of combinations of features to identify spikes associated with combinations of features. Information describing spikes associated with features is stored in the feature store 355.

The feature evaluator 360 evaluates specific features to determine whether the feature is indicative of malicious or bad content in messages or indicative of non-malicious or good content in the messages. The feature evaluator 360 may select features associated with spikes identified by the feature analyzer 325 and stored in the feature store 355 for evaluation. The feature evaluator 360 sends a challenge question to the senders of messages comprising a feature being evaluated. Alternatively, the feature evaluator 360 sends a request for enhanced authentication to the senders of the message. The request for enhanced authentication can require the user to enter special authentication information, for example, a login and password or require communication via a specific channel, for example, via a phone or text messaging. The responses to the challenges or the requests for enhanced authentication received from the senders are analyzed to determine whether the feature is indicative of good or bad content. If more than a threshold percentage of senders of messages comprising a feature pass authentication, the feature can be considered being indicative of good content in the messages. If the number of senders of messages comprising a feature is below a threshold value, the feature can be considered indicative of bad content in the messages. If a feature is determined to be associated with good content, the feature is added to a white-list. On the other hand, a feature associated with bad content is added to a black-list. In an embodiment, the structure for representing membership of features in the white-list or black-list is stored in the feature store 355 and comprises flags indicating the membership.

The authentication manager 330 determines whether a message sent via the social interaction system 100 is sent from a user account by an authentic user of the account or by a malicious user who has illegally stolen the account. The authentication manager 330 verifies whether the sender recognizes the message sent and can verify his authenticity using his credentials. Since the credentials of the user can also be stolen, the authentication manager 330 may use various mechanisms to verify authenticity of the sender. For example, the authentication manager 330 may send challenge questions to a user and require the user to answer the challenge questions. In an embodiment, the challenge questions may be stored in a separate store from the user account store 350 so that a user that manages to steal information in the user account store 350 does not get access to the challenge questions. In some embodiments, the challenge questions may be encrypted to ensure higher security. If the information in the user account store is also encrypted, the challenge questions may be encrypted via a different mechanism.

In an embodiment where the social interaction system 100 is a social networking system, a challenge may be presented to the user based on social information that is likely to be known only to the authentic user. Social information that is likely to be known only to a user includes information based on recent interactions between the user and the user's friends on the social networking system, information about the friends of the user on the social networking system, and the like. Systems and methods for using social information for authentication are disclosed in U.S. application Ser. No. 12/399,723 filed on Mar. 6, 2009, which is incorporated by reference in its entirety.

In some embodiments, a level of maliciousness may be associated with a feature that is associated with a spike. The level of maliciousness may be determined based on the type of actions associated with the feature. For example, a feature indicative of potentially harmful executable code being attached with messages can be associated with a higher level of maliciousness. On the other hand a feature indicative of spam messages may be associated with a relatively lower level of maliciousness. In some embodiments, a feature identifying a sender may be associated with a risk based on past reputation of the senders. Systems and methods for determining reputations of user locations are disclosed in U.S. application Ser. No. 12/646,803 filed on Dec. 23, 2009, which is incorporated by reference in its entirety. For example, a sender of messages can be associated with a netblock identified as a feature. If the netblock has a reputation of being associated with malicious activities in the past, the feature may be identified as being risky. Accordingly, the threshold of occurrences required to qualify an increase in occurrences as a spike is reduced. As a result, smaller increases in the occurrences of the feature may be considered suspicious, requiring enhanced authentications of users. Furthermore, if the feature is considered risky, the threshold number of users that need to pass authentication can be increased. As a result, more senders of the messages need to pass authentication to qualify the feature as indicative of good content.

Based on the level of maliciousness associated with a feature as determined by the feature analyzer 325, the authentication manager 330 can require an appropriate level of authentication from a user to verify the authenticity of the sender of a message comprising the feature. The authentication manager 330 may associate a challenge question with a level of difficulty. Some challenge questions may be considered more difficult than others and be assigned a higher score indicating the difficulty level of the challenge compared to others. Alternatively, the authentication manager 330 can increase the level of authentication by increasing the number of challenge questions presented to the user for authentication. Therefore, the authentication manager 330 determines the level of difficulty of the challenge question or the level of authentication based on the level of maliciousness associated with the feature.

Figure 4:
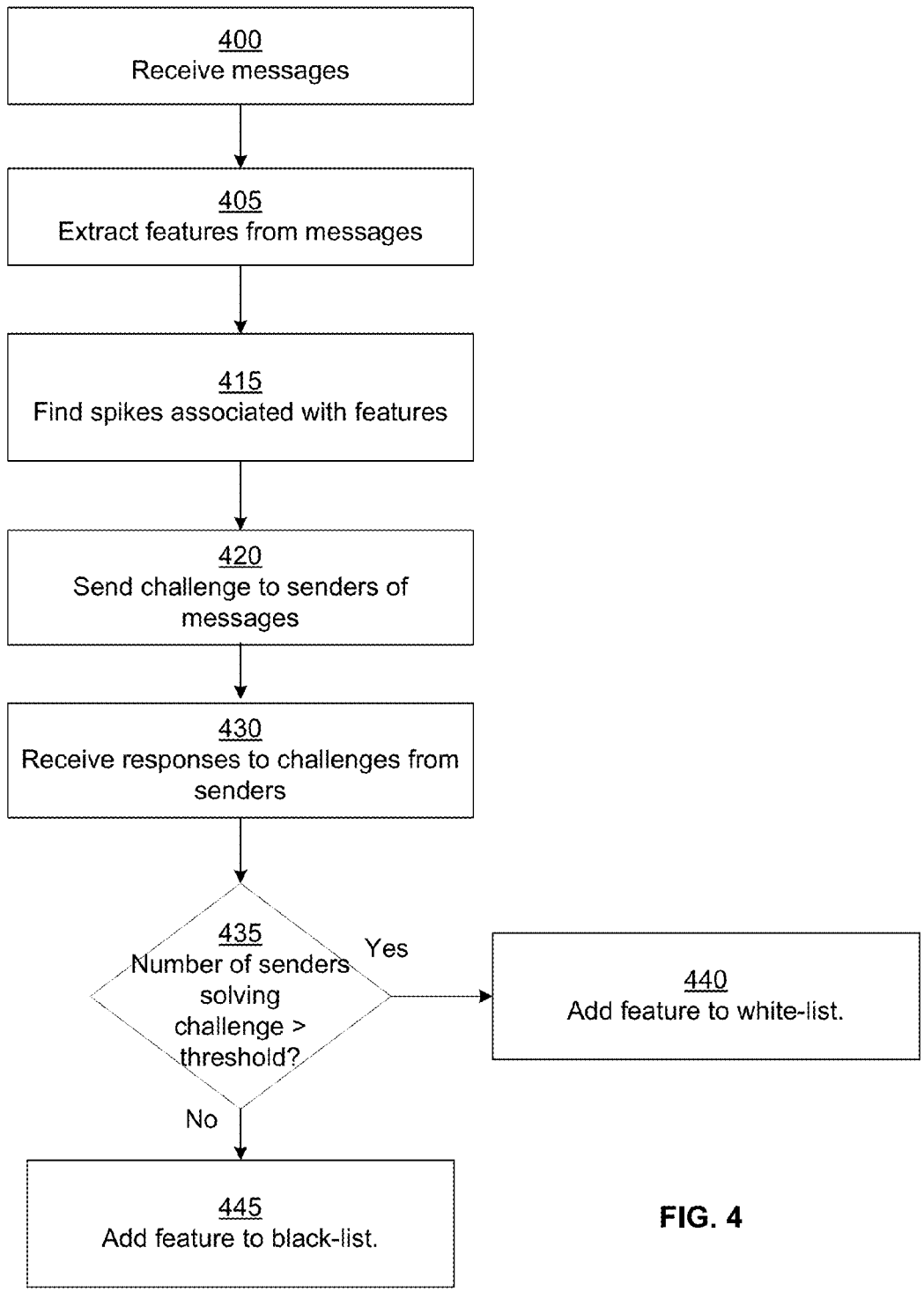
FIG. 4 is a flowchart of the process illustrating how features in messages are classified as bad or good, in accordance with an embodiment of the invention.

FIG. 4 is a flowchart of the process illustrating how features in content are classified as bad or good, in accordance with an embodiment of the invention. The message server 310 receives 400 messages sent by client devices 110. The messages are stored by the message server 310 in the message store 345. The feature extractor 320 extracts 405 the features from the messages received 400. The feature analyzer 325 analyzes variations over time of frequency of messages comprising each feature to find 415 spikes associated with feature. A sudden increase in the number of messages comprising a feature in a short time interval is considered a spike in the feature. If a spike is observed in a feature, the feature evaluator 360 sends 420 one or more challenge questions to senders of the messages comprising the feature.

In an embodiment, a subset of users is selected for enhanced authentication based on previous history of the users. For example, the user ID is considered a feature that the system tracks challenge response feedback on. Features identifying users that are determined to have bad history of authentication as indicated by repeated failed attempts to login can be required higher level of authentication. Other features associated with users include IP Address or IP netblocks. The feedback on user ID may be weighted higher than feedback on IP addresses or netblocks less since IP addresses and netblocks can be shared by users. Another feature associated with the user is machine cookie for which feedback is obtained.

Responses to the challenge questions are received 430 by the message server 310. The response to a challenge question may be a correct answer, an incorrect answer, or the sender ignoring the question. The feature evaluator 360 analyzes the responses to challenge questions sent. Based on the percentage of senders that answered the challenge questions correctly, answered the challenge incorrectly, declined to answer the challenge, or ignored the challenge, the feature evaluator decides whether to add the feature to a white-list or to a black-list. For example, if the number of senders that solve the challenge questions correctly determined 435 to be above a threshold percentage value, the feature is added 440 to a whit-list, otherwise the feature is added 445 to a black-list.

Figure 5:
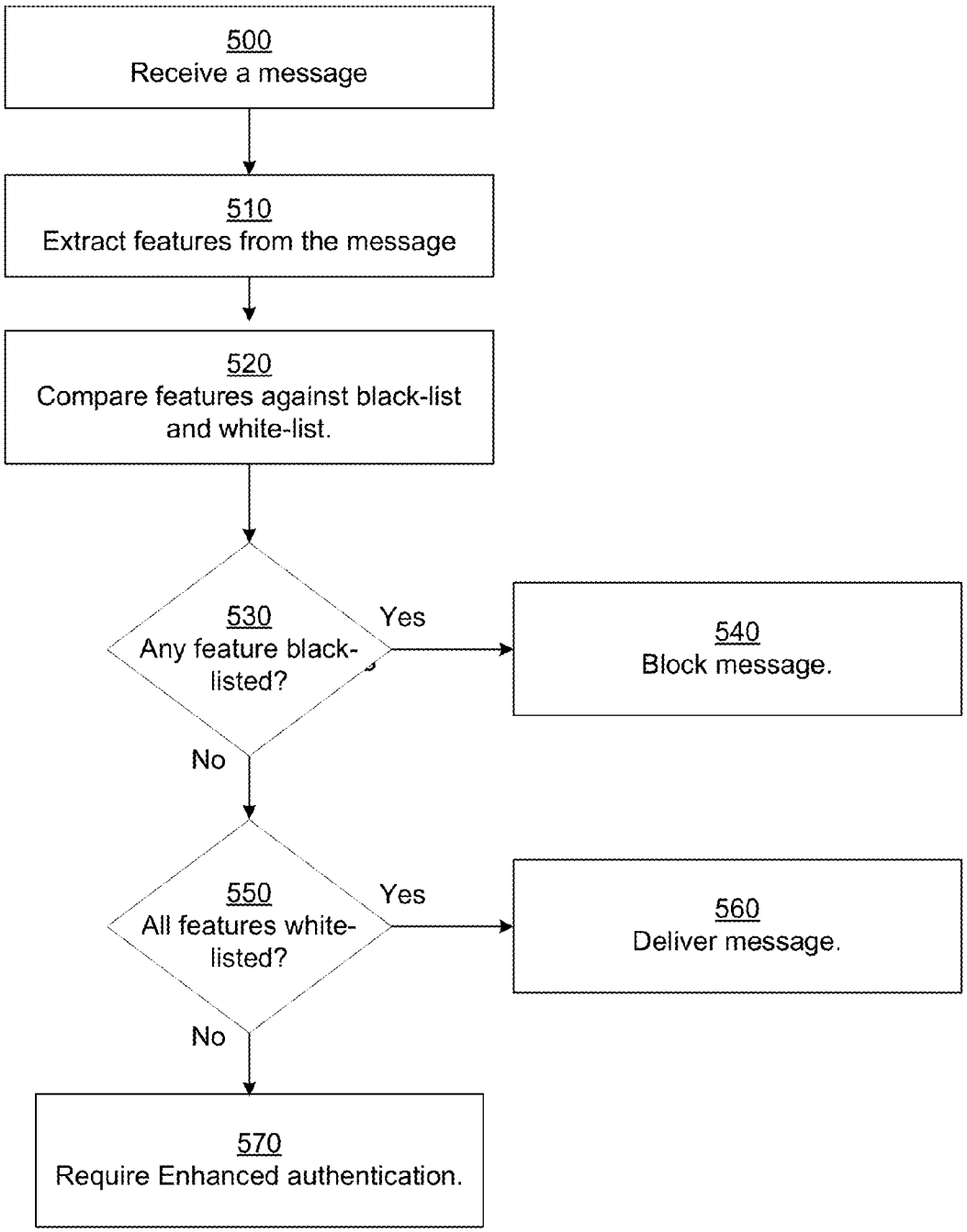
FIG. 5 is a flowchart of a process illustrating how black-lists and white-lists of features are used to determine how subsequent messages are processed, in accordance with an embodiment of the invention.

FIG. 5 is a flowchart of a process illustrating how black-lists and white-lists of features are used to determine whether incoming messages are delivered or blocked, in accordance with an embodiment of the invention. Subsequent to receiving 500 a message by the message server 310, the feature extractor 320 extracts 510 features from the message. The features of the message received are compared 520 against the features in the black-list and the white-list. If any feature of the incoming message is determined 530 to be black-listed, the incoming message is blocked 540. If there are no black-listed features in the incoming message as well as all features identified in the incoming message are determined 550 to be white-listed, the message is successfully delivered 560. If the incoming message comprises features being evaluated by the feature evaluator 360 for malicious content, the message may be temporarily blocked and may require 570 authentication of the sender before the message is delivered. In one embodiment, the success/failure of authentications of senders of messages comprising a feature is analyzed. If the percentage of successful authentications over a period of time of senders of messages comprising a feature increases above a threshold value, the feature can be moved from a black-list to a white-list. Alternatively, if the successful authentications associated with the feature increase above a threshold value over a period of time, a score indicative of maliciousness of the feature can be reduced.

In some embodiments, combinations of features are analyzed to detect spikes in messages comprising the combination of features. For example, a combination of a netblock and a particular message interface as a feature may be associated with a spike. Alternatively, the netblock, the message interface, and a particular time of the day combined may be associated with a spike. For example, certain computer systems using the netblock may use a particular message interface to send malicious messages during a specific time period close to midnight. A sudden spike in messages comprising a set of features can be indicative of possible malicious activities. The combination of features may be black-listed or white-listed based on the percentage of senders that answer challenge questions presented to them or based on a percentage of senders that pass a specific authentication.

In some embodiments, when a feature is black-listed, other features are analyzed to determine if they are correlated to the black-listed features. For example, a spike related to messages comprising a specific URL as a feature may be correlated to messages originating in a certain netblock. This is beneficial since some features may be easier to detect than other features. Furthermore, the same netblock may be associated with other spikes corresponding to different URLs being sent in messages. In some embodiments, correlation of a feature with other features that are determined malicious is used to assign a higher score indicative of maliciousness of the feature. Alternatively a feature that consistently correlates with another feature that is found malicious can be automatically determined to be malicious without requiring independent authentication from users. Such analysis of features can be performed on historical data available in message store 345 and action log 335. For example, if a feature is black-listed, historical data associated with the feature can be analyzed to determine if there are other features that are correlated with the feature that can also be black-listed.

In some embodiments, the threshold of number of messages that must be exceeded for determining whether a spike exists in a time interval depends on the type of feature. Some features may be assumed to be associated with a risk. For example, a feature corresponding to specific types of attachments with messages or a feature corresponding to a specific type of URL being included in a message is considered relatively a higher risk behavior compared to a feature corresponding to messages being sent at a particular time of the day. The level of risk associated with a feature can be specified by an administrator. Alternatively machine learning techniques based on a training set can be used to determine a level of risk associated with a feature. Accordingly, the number of messages that must be exceeded to determine whether a spike exists in a time interval can be lower for some types of features that are considered less risky. As a result, even if there is a smaller increase in the number of messages comprising a risky feature, the increase may be qualified as a spike. On the other hand, a higher threshold of number of messages must be exceeded in order to characterize the increase as a spike for less risky features.

ALTERNATIVE APPLICATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    receiving, at a social networking system, a plurality of posts from a plurality of users of a user-provided content system, each post for display to one or more other users of the system;
    identifying a set of features associated with the received posts, each feature being extracted from content in one or more posts and not in a black list maintained by the social networking system;
    identifying a feature of the set of features based on a rate of occurrence of the feature in the plurality of posts and one or more types of actions associated with the feature;
    determining a level of maliciousness of the identified feature based on the one or more types of actions associated with the identified feature;
    requesting enhanced authentication from one or more users who generated the posts in which the identified feature occurred based on the determined level of maliciousness associated with the identified feature;
    determining that the identified feature is indicative of bad content based on a rate of users who passed the authentication;
    adding the identified feature to the black list; and
    blocking from display subsequent posts received in which the identified feature occurs.

2. The computer implemented method of claim 1, wherein the identified feature is indicative of bad content if the rate of users who passed the authentication is less than a threshold rate.

3. The computer implemented method of claim 1, further comprising:
    responsive to determining that the identified feature is indicative of bad content, blocking display of the post.

4. The computer implemented method of claim 1, wherein the rate of users required to pass authentication is determined based on a measure of risk associated with the set of features.

5. The computer implemented method of claim 1, wherein the rate of users required to pass authentication is determined based on the rate of occurrence of the identified feature in the plurality of posts received.

6. The computer implemented method of claim 1, further comprising:
    determining a second rate of users who passed the authentication;
    determining that the identified feature is indicative of good content based on the second rate;
    removing the identified feature from the black list; and
    unblocking from display subsequent posts received in which the identified feature occurs.

7. The computer implemented method of claim 1, wherein the identified feature is indicative of good content if the second rate of users who passed the authentication exceeds a threshold rate.

8. The computer implemented method of claim 1, further comprising:
    responsive to determining that the identified feature is indicative of good content, unblocking display of the post.

9. The computer implemented method of claim 1, wherein enhanced authentication comprises sending a challenge question.

10. The computer implemented method of claim 1, further comprising determining a metric describing a level of risk associated with the identified feature based on the rate of users passing authentication.

11. The computer implemented method of claim 1, wherein the identified feature comprises a uniform record locator address included in a post.

12. The computer implemented method of claim 1, wherein the identified feature comprises a network address of a generator of a post.

13. The computer implemented method of claim 1, wherein the identified feature comprises a netblock associated with a generator of a post.

14. The computer implemented method of claim 1, wherein the identified feature comprises a domain of a generator of a post.

15. The computer implemented method of claim 1, wherein the identified feature comprises a regular expression based on terms included in a post.

16. The computer implemented method of claim 1, wherein the identified feature comprises a time of day associated with transmission of a post.

17. The computer implemented method of claim 1, wherein the identified feature comprises information identifying an application executing on a client device sending a post.

18. The computer implemented method of claim 17, wherein the application executing on a client device is a browser application and the information identifying the browser is a hash value based on browser settings.

19. The computer implemented method of claim 1, wherein the identified feature comprises a netblock of a generator of a message and information describing an interface used to communicate the message.

20. A non-transitory computer-readable storage medium comprising instructions executable by a processor, the instructions for:

receiving, at a social networking system, a plurality of posts from a plurality of users of a user-provided content system, each post for display to one or more other users of the system;

identifying a set of features associated with the received posts, each feature being extracted from content in one or more posts and not in a black list maintained by the social networking system;

identifying a feature of the set of features based on a rate of occurrence of the feature in the plurality of posts and one or more types of actions associated with the feature;

determining a level of maliciousness of the identified feature based on the one or more types of actions associated with the identified feature;

requesting enhanced authentication from one or more users who generated the posts in which the identified feature occurred based on the determined level of maliciousness associated with the identified feature;

determining that the identified feature is indicative of bad content based on a rate of users who passed the authentication;

adding the identified feature to the black list; and blocking from display subsequent posts received in which the identified feature occurs.

* * * * *